United States Patent [19]

Gough et al.

[11] 3,928,285

[45] Dec. 23, 1975

[54] SYNERGISTIC ORGANOTIN BORATE STABILIZER COMPOSITION AND RESINS CONTAINING SAME

[75] Inventors: Robert George Gough; Francis Joseph Buescher, both of Cincinnati, Ohio

[73] Assignee: Cincinnati Milacron, Inc., Cincinnati, Ohio

[22] Filed: Jan. 16, 1975

[21] Appl. No.: 541,495

[52] U.S. Cl. ..... 260/45.75 K; 252/406; 260/45.7 S; 260/45.85 H; 260/45.85 S
[51] Int. Cl.² ........................................... C08G 6/00
[58] Field of Search ............... 260/45.75 K, 45.85 S, 260/45.85 H, 45.75; 252/406

[56] References Cited

UNITED STATES PATENTS

| | | | |
|---|---|---|---|
| 2,867,641 | 1/1959 | Ranisden | 260/45.75 K |
| 3,167,527 | 1/1965 | Hechenbleikner et al. | 260/45.75 K |
| 3,635,883 | 1/1972 | Stamm | 260/45.75 K |

*Primary Examiner*—V. P. Hoke
*Attorney, Agent, or Firm*—Donald Dunn

[57] ABSTRACT

A synergistic stabilizer composition comprising an organotin borate and an organic thiol is provided. Polyvinyl chloride resin containing the synergistic stabilizer composition exhibits improved resistance to early discoloration during processing.

21 Claims, No Drawings

SYNERGISTIC ORGANOTIN BORATE STABILIZER COMPOSITION AND RESINS CONTAINING SAME

BACKGROUND

This invention relates to novel synergistic stabilizer compositions comprising an organotin borate and an organic thiol compound. Additionally this invention relates to methods for improving the resistance to early color formation during processing of vinyl halide homopolymers, copolymers and mixtures of polymers containing vinyl halide homopolymers or copolymers. Further, this invention relates to plastic compositions comprising (1) vinyl halide homopolymers or copolymers or mixture of polymers containing vinyl halide homopolymer or copolymer, and (2) a synergistic stabilizer composition comprising an organotin borate and an organic thiol.

It is well known in the plastic art to process organic polymeric materials, particularly thermoplastic materials, at elevated temperatures into intermediate and finished products of commerce. Such processes as injection molding, extrusion, roll milling and blowing are conventionally employed to produce useful thermoplastic products such as pipes, bottles, baskets, etc. Vinyl halide polymers (e.g., polyvinyl chloride), copolymers and mixtures of polymers which contain vinyl halide polymers or copolymers are conveniently processed by these well known art methods. However, during the elevated temperature processing of plastics, particularly the thermoplastics, more particularly the vinyl halide homopolymers, copolymers and mixtures of polymers which contain vinyl halide homopolymers or copolymers, degradation of the plastic can occur. This degradation is manifested by a development or change of color and is particularly noticeable in unstabilized plastics (i.e., plastics which do not contain stabilizers). Degradation or discoloration during processing is particularly undesirable in clear or lightly colored plastics. Therefore, it is desirable to prevent or inhibit the discoloration of plastics during processing so as to achieve useful products free of discoloration.

To inhibit or prevent discoloration of vinyl halide homopolymers, copolymers and mixtures of polymers containing vinyl halide homopolymers or copolymers it has been known in the art to incorporate therein such materials as organic thiols, hindered phenols, tin carboxylates, organotin carboxylates, and organotin mercaptides. Synergistic combinations such as a combination of an organic thioanhydride and a monohydrocarbyl tin compound having the formula $R^3Sn(Z)_n(Z'R^4)_{3-2n}$ where $R^3$ is a 1 to 12 carbon atom hydrocarbyl radical, Z and Z' are either oxygen or sulfur, $R^4$ is hydrogen or an organic radical bonded to Z' by a carbon atom and $n$ is 0–1.5 as disclosed in U.S. Pat. No. 3,822,233, have also been reported for improving the resistance of halogen containing resin to early color development during processing. Many of these materials which have been used or suggested to be used to improve the resistance of halogen containing resins to early color development during processing have not been entirely satisfactory, or are expensive or are difficult to make, or have undesirable properties such as being odoriferous during processing of the plastic or in themselves impart some initial color to the plastic.

It is, therefore, an object of this invention to provide a synergistic stabilizer composition comprising an organotin borate and an organic thiol compound for improving the resistance of halogen containing polymers to early color development during processing at elevated temperatures. A further object of this invention is to provide a plastic composition exhibiting improved resistance to early color development during elevated temperature processing. A still further object of this invention is to provide a method for improving the resistance to early color formation of halogen containing polymers.

SUMMARY OF THE INVENTION

It has been discovered that the foregoing objects and others can be achieved by a novel synergistic stabilizer composition comprising (1) an organotin borate, and (2) an organic thiol compound having a molecular weight of from 40 to 400 per thiol group and a boiling point of at least 180° C at one atmosphere pressure, the organotin borate being a member selected from organotin borates having the following general formulae:

(a) 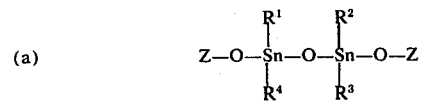

(b) 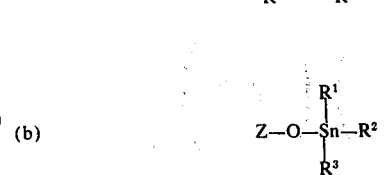

(c) 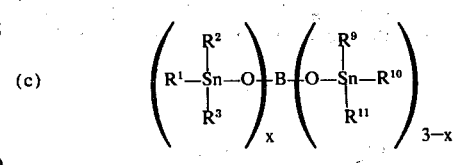

where $R^1$, $R^2$, $R^3$, $R^4$, $R^9$, $R^{10}$ and $R^{11}$ are the same or different and are an aryl group, aralkyl group, alkaryl group or $C_1$ to $C_8$ alkyl group, $x$ is 0, 1 or 2 and Z is

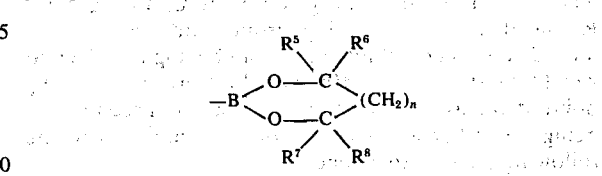

where $R^5$ and $R^7$ are hydrogen or $C_1$ to $C_4$ alkyl groups, $R^6$ and $R^8$ are $C_1$ to $C_4$ alkyl groups and $n$ is 0, 1 or 2. Further, what has been discovered is novel plastic compositions having improved resistance to early color formation during processing comprising a vinyl halide homopolymer, copolymer or polymer mixture containing vinyl halide homopolymer or copolymer and the foregoing synergistic stabilizer composition comprising an organotin borate and an organic thiol compound as specified.

The synergistic stabilizer compositions of this invention are especially suitable for stabilizing halogen containing homopolymers, copolymers and polymer blends containing halogen containing homopolymers or copolymers, more particularly vinyl halide homopolymers, copolymers and polymer blends containing vinyl halide homopolymers or copolymers, against early color formation during elevated temperature processing. The novel plastic compositions of this invention find utility in making articles of commerce such as pipes and bottles by such methods as injection molding, blow molding and extrusion.

DESCRIPTION OF THE INVENTION

In accordance with this invention there is provided a novel synergistic stabilizer composition comprising (1) an organotin borate which is a member selected from organotin borates having the following general formulae:

(a) 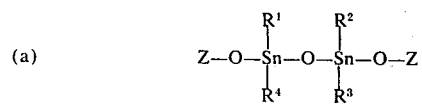

(b) 

(c) 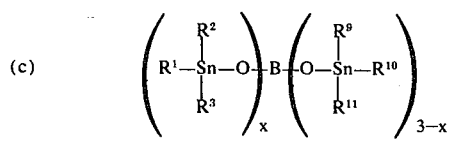

where $R^1$, $R^2$, $R^3$, $R^4$, $R^9$, $R^{10}$ and $R^{11}$ are the same or different and are an aryl group, aralkyl group, alkaryl group or $C_1$ to $C_8$ alkyl group, $x$ is 0, 1 or 2 and Z is

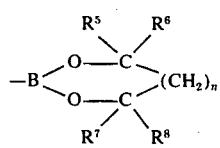

where $R^5$ and $R^7$ are hydrogen or $C_1$ to $C_4$ alkyl groups, $R^6$ and $R^8$ are $C_1$ to $C_4$ alkyl groups and $n$ is 0, 1 or 2 and (2) an organic thiol compound having a molecular weight of from 40 to 400 per thiol group, a boiling point of at least 180°C at one atmosphere pressure and being a member selected from organic thiols having the following general formulae:

(d) 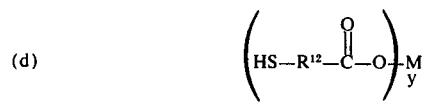

(e) 

(f) 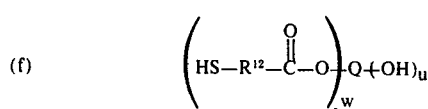

(g) 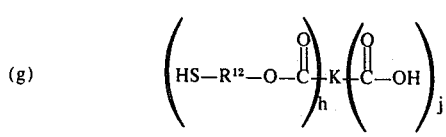

where $R^{12}$ is a $C_1$ to $C_{20}$ linear or branched alkylene radical, $R^{13}$ is an aromatic or $C_3$ to $C_{36}$ aliphatic group having a free valence equal to $v$, M is hydrogen, calcium, barium, tin, cadmium or lead, Q is saturated or unsaturated aliphatic group, cycloaliphatic group, or aromatic group, and having a free valence equal to $(w + u)$, K is a saturated or unsaturated aliphatic group, cycloaliphatic group or aromatic group having a free valence equal to $(h + j)$, $y$ is 1 to 4, $v$ is 1 to 6, $w$ is 1 to 8, $u$ is 0 to 7, $h$ is 1 to 4 and $j$ is 0 to 3, wherein $u + w$ is from 1 to 8 and $h + j$ is from 1 to 4. Further, in accordance with this invention there are provided plastic compositions having improved resistance to early color formation during processing comprising (1) a plastic which is a vinyl halide homopolymer, vinyl halide copolymer or a polymer blend containing a vinyl halide homopolymer or vinyl halide copolymer, (2) an organotin borate which is a member of the group of organotin borates having the following formulae:

(a) 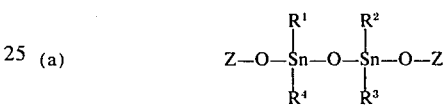

(b) 

(c) 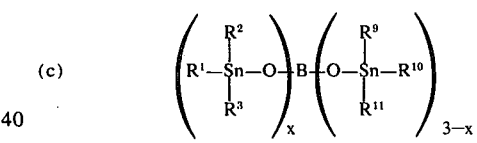

where $R^1$, $R^2$, $R^3$, $R^4$, $R^9$, $R^{10}$ and $R^{11}$ are the same or different and are an aryl group, aralkyl group, alkaryl group or $C_1$ to $C_8$ alkyl group, $x$ is 0, 1 or 2 and and Z is

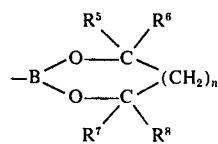

where $R^5$ and $R^7$ are hydrogen or $C_1$ to $C_4$ alkyl groups, $R^6$ and $R^8$ are $C_1$ to $C_4$ alkyl groups and $n$ is 0, 1 or 2 and (3) an organic thiol compound having a molecular weight of from 40 to 400 per thiol group, a boiling point of at least 180°C at one atmosphere and being a member selected from organic thiols having the following formulae:

(d) 

(e) 

(f) 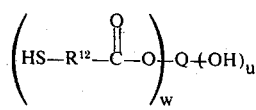

(g) 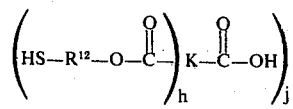

where $R^{12}$ is a $C_1$ to $C_{20}$ linear or branched alkylene radical, $R^{13}$ is an aromatic or $C_3$ to $C_{36}$ aliphatic group having a free valence equal to $v$, M is hydrogen, calcium, barium, tin, cadmium or lead, Q is a saturated or unsaturated aliphatic group, cycloaliphatic group, or aromatic group and having a free valence equal to ($w + u$), K is a saturated or unsaturated aliphatic group, cycloaliphatic group or aromatic group having a free valence equal to ($h + j$), $y$ is 1 to 4, $v$ is 1 to 6, $w$ is 1 to 8, $u$ is 0 to 7, $h$ is 1 to 4 and $j$ is 0 to 3, wherein $u + w$ is from 1 to 8 and $h + j$ is from 1 to 4.

In the practice of this invention the weight ratio of organotin borate to organic thiol may vary widely. It is, however, preferred to use a weight ratio of organotin borate to organic thiol in the range of from 1:4 to 4:1 and more preferably in the range of from 1:1 to 7:3. The combined weight concentration of organotin borate and organic thiol in the plastic compositions of this invention may vary widely, the principle limitation being that there be at least a stabilizingly effective total amount of the organotin borate and organic thiol. It is well recognized that total amounts of organotin borate and organic thiol substantially higher than needed to stabilize the plastic against early color formation during processing can be used in the plastic compositions of this invention, however, such concentrations would not be required. Thus in the practice of the plastic compositions of this invention it is preferred to use a total weight concentration of organotin borate, plus organic thiol compound of from 0.01 to 5 weight percent based on the weight of the plastic component itself and more preferably from 0.5 to 1.0 weight percent based on the plastic component, said plastic component being the vinyl halide homopolymer, vinyl halide copolymer or polymer blend containing a vinyl halide homopolymer or vinyl halide copolymer.

The organotin borates usuable in the practice of this invention are characterized by having the tin atom bonded to boron through an oxygen atom, tin bonded directly to carbon and optionally a tin-oxygen-tin bond and are members of the series of organotin borates having the following formulae:

(a) 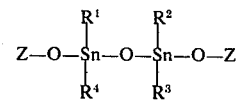

(b) 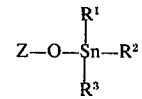

(c) 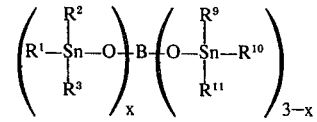

where $R^1$, $R^2$, $R^3$, $R^4$, $R^9$, $R^{10}$, $R^{11}$ and $x$ are as previously defined herein and Z is

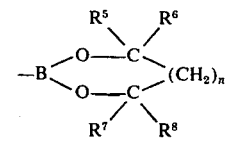

where $R^5$, $R^6$, $R^7$, $R^8$ and $n$ are as previously defined herein.

Examples of organotin borates usable in the practice of this invention include but are not limited to the following enumerated compounds.

(a) 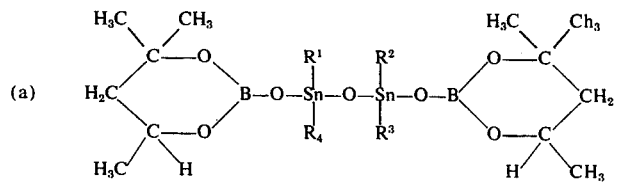

($a$–1) where $R^1$, $R^2$, $R^3$ and $R^4$ are n-butyl group, ($a$–2) where $R^1$, $R^2$, $R^3$ and $R^4$ are isobutyl groups, ($a$–3) where $R^1$, $R^2$, $R^3$ and $R^4$ are 2-ethylhexyl groups, ($a$–4) where $R^1$, $R^2$, $R^3$ and $R^4$ are octyl groups, ($a$–5) where $R^1$, $R^2$, $R^3$ and $R^4$ are propyl groups, ($a$–6) where $R^1$, $R^2$, $R^3$ and $R^4$ are ethyl groups, ($a$–7) where $R^1$, $R^2$, $R^3$ and $R^4$ are methyl groups, ($a$–8) where $R^1$ and $R^4$ are methyl and $R^2$ and $R^3$ are butyl groups, ($a$–9) where $R^1$, $R^2$, $R^3$ and $R^4$ are phenyl groups, ($a$–10) where $R^1$, $R^2$, $R^3$ and $R^4$ are benzyl groups, ($a$–11) where $R^1$, $R^2$, $R^3$ and $R^4$ are tolyl groups, and ($a$–12) where $R^1$ and $R^4$ are phenyl and $R^2$ and $R^3$ are benzyl groups, ($a$-13) 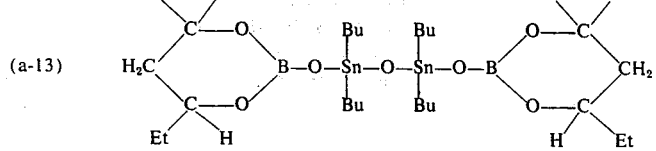

where Et = ethyl and Bu = n-butyl, (b) 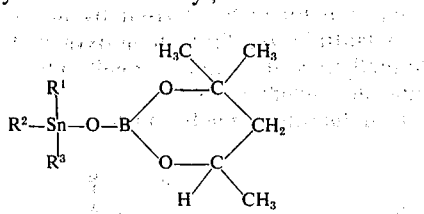

(b–1) where $R^1$, $R^2$ and $R^3$ are methyl groups, (b–2) $R^1$, $R^2$ and $R^3$ are ethyl groups, (b–3) where $R^1$, $R^2$ and $R^3$ are n-butyl groups, (b–4) where $R^1$, $R^2$ and $R^3$ are isobutyl groups, (b–5) where $R^1$, $R^2$ and $R^3$ are 2-ethylhexyl groups, (b–6) where $R^1$, $R^2$ and $R^3$ are phenyl groups, (b–7) where $R^1$, $R^2$ and $R^3$ are benzyl groups, (b–8) where $R^1$, $R^2$ and $R^3$ are tolyl groups, (b–9) where $R^1$ and $R^2$ are methyl and $R^3$ is butyl, and (b–10) where $R^1$ and $R^2$ are phenyl and $R^3$ is benzyl.

(c) 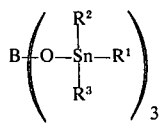

(c–1) where $R^1$, $R^2$ and $R^3$ are methyl groups, (c–2) where $R^1$, $R^2$ and $R^3$ are ethyl groups, (c–3) where $R^1$, $R^2$ and $R^3$ are n-butyl groups, (c–4) where $R^1$, $R^2$ and $R^3$ are isobutyl groups, (c–5) where $R^1$, $R^2$ and $R^3$ are 2-ethylhexyl groups, (c–6) where $R^1$, $R^2$ and $R^3$ are phenyl groups, (c–7) where $R^1$, $R^2$ and $R^3$ are benzyl groups, (c–8) where $R^1$, $R^2$ and $R^3$ are tolyl groups, (c–9) where $R^1$ and $R^2$ are methyl and $R^3$ is butyl, and (c–10) where $R^1$ and $R^2$ are phenyl and $R^3$ is benzyl, (c-11) 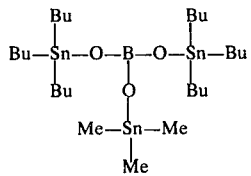

where Bu = n-butyl and Me = methyl.

A number of methods may be used to prepare the organotin borates usable in the practice of this invention. One method, for example, is to react a borate ester of a glycol with a dialkyl tin oxide in a solvent forming an azeotrope with water with removal of water by azeotropic distillation. The borate esters used to prepare the organotin borate usable in the practice of this invention can be prepared by reacting boric acid with a glycol. Suitable glycols include 2-methyl-2, 4-pentanediol; 2, 4-dimethyl-2, 4-pentanediol; 2, 3-dimethyl-2, 3-butanediol; and 2, 5-dimethyl-2, 5-hexanediol. Typical dialkyl tin oxides usable in the preparation of organotin borates include dibutyltin oxide, dimethyl tin oxide, dioctyltin oxide, ditolyltin oxide, dibenzyltin oxide, dicyclohexyltin oxide, diphenyltin oxide, butylphenyltin oxide, butyloctyltin oxide, and butylbenzyltin oxide.

The organic thiol compounds usable in the practice of this invention are organic thiol compounds which are substantially free of odor during elevated temperature processing of the plastic, which have free thiol (—SH) groups, a molecular weight of from 40 to 400 per thiol group in the compound and a boiling point of at least 180° C at one atmosphere pressure. By a molecular weight of not greater than 400 per thiol group what is meant is that when the molecular weight of the organic thiol compound is divided by the number of thiol groups in the compound the resulting value shall be at least 40 and shall not exceed 400. Thus, for example, an organic thiol having a molecular weight of 200 and two thiol groups would have a molecular weight per thiol group of 100. Organic thiol compounds usable in the preferred practice of this invention are organic thiols, substantially free of odor during the elevated temperature processing of the plastic, having a molecular weight per thiol group of from 40 to 400, a boiling point of at least 180° C at one atmosphere and are members selected from organic thiol compounds having the following general formulae:

(d) 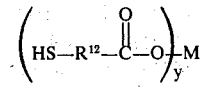

(e) 

(f) 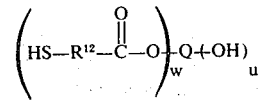

(g) 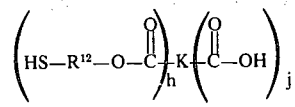

where $R^{12}$, $R^{13}$, Q, K, y, v, w, u, h and j are as have been previously defined herein.

Examples of organic thiol compounds usable in the practice of this invention include but are not limited to:
isooctyl thioglycolate
octyl thioglycolate
2-ethylhexyl thioglycolate
isooctyl-3-mercaptopropionate
octyl-3-mercaptopropionate
dodecyl thiol
butyl thioglycolate
benzyl thioglycolate
octadecyl thioglycolate
1-octanethiol
toluenethiol
dodecylphenyl thiol
2-thioethyl octanoate
3-mercapto-1, 2-propane diol
dioctyl mercaptosuccinate
mercaptosuccininic acid
2, 2'-thiodiethanethiol p-chlorobenzyl mercaptan
pentaerythritol tetra (thioglycolate)
dipentaerythritol hexa (3-mercaptopropionate)
tripentaerythritol hexa (3-mercaptopropionate)
pentaerythritol tris (thioglycolate)
pentaerythritol bis (thioglycolate)
trimethylolethane tris (3-mercaptopropionate)
trimethylolpropane bis (thioglycolate)
calcium salt of β-mercaptopropronic acid
barium salt of mercaptoacetic acid
bis (2-mercaptoethyl) terephthalate
mono (2-mercaptoethyl adipate The thiols usable in the practice of this invention may be prepared by any of a number of methods well known in the chemical art as for example the reaction of an alkyl halide with sodium hydrosulfide, reaction of an olefinic unsaturated compound with hydrogen sulfide and pyrolytic cleavage of an organic sulfide. Additionally the thiols usable in the practice of this invention are those which do not in themselves promote or accelerate decomposition of the plastic.

As vinyl halide homopolymers, vinyl halide copolymers and polymer blends containing vinyl halide homopolymers or vinyl halide copolymers uable in the practice of this invention there, for example, may be used (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylates, methyl alpha chloroacrylate, styrene, vinyl ethers such as vinyl ethyl ether, vinyl chloroethyl ether, vinyl phenyl ether, vinyl ketones such as vinyl methyl ketone, vinyl phenyl ketone, 1 fluoro, 1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrille-butadiene-styrene copolymer and polyvinyl chloride and polyethylene and polymethyl methacrylate. Typical vinyl halide copolymers usable in this invention include vinyl chloride-vinyl acetate (87:13), vinyl chloride-vinylidene chloride (95:5), vinyl chloridediethylfumarate (95:5), vinyl chloride-trichloroethylene (95:5) and vinyl chloride-2 ethylhexyl acrylate (80:20). The polymer blends usable in the practice of this invention comprise physical blends of at least two distinct polymeric species and contain from 25 to 95 weight percent of vinyl halide homopolymer or vinyl halide copolymer. The vinyl halide copolymers usable in the practice of this invention are copolymers comprising from 25 to 95 mole percent vinyl halide units.

In the novel plastic compositions of this invention there may be present, in addition to the organotin borate and organic thiol compound combination of this invention, conventional additives such as fillers, pigments, plasticizers, dyes, lubricants, and ultraviolet light stabilizers well known to the plastic art. Among the fillers, such materials as calcined clays, calcium carbonate, and talcs are used. Pigments well known in the art can be used including materials as titanium dioxide, carbon black and iron oxide. Included among the well known plasticizers which are usable are phthalates, sebecates, adipates, phosphates and fatty esters having between 16 and 150 carbon atoms. Lubricants, well known in the art, which may be used include hydrocarbon waxes, stearyl stearate, cetyl palmitate and other ester waxes. Stabilizers such as the well known ortho hydroxy benzophenones, hydroxy benzotriazoles organotin carboxylates, organotin sulfides, and organotin mercaptocarboxylic acid esters may be used. Antioxidants include tricresyl phosphite; 2, 6-di-t-butyl-4-methyl phenol; 2, 6-di-t-butyl-4-decyloxy phenol and 2-t-butyl-4-octadecyloxy phenol.

Methods well known in the art for compounding plastic compositions for subsequent processing by methods such as injection molding, extrusion and the like may be used for the preparation of the plastic compositions of this invention. Such methods include dry blending with conventional mixers such as the well known Henchel blender, blending on to a two or three roll mill and tumbling. The organotin borate-organic thiol compound synergistic stabilizer compositions of this invention may be prepared by blending techniques well known in the art and include dry blending by low speed, low shear mixers, tumbling and the like. The plastic compositions of this invention may be prepared by first blending together the organotin borate and the organic thiol compound and subsequently adding the resultant blend to the vinyl halide homopolymer, vinyl halide copolymer or polymer blend containing a vinyl halide homopolymer or vinyl halide copolymer. Alternatively the organotin borate and organic thiol compound may be each separately added to the vinyl halide polymer, vinyl halide copolymer or the homopolymer containing a vinyl halide homopolymer or copolymer. The order of the separate addition of the organotin borate and organic thiol compound may vary, it not being critical as to which of these two materials is added first and which is added thereafter.

EXAMPLES

The following examples are presented to further describe the invention and the practice thereof and are not intended to be limiting on the invention or its practice. In the following examples all amounts, ratios, and percentages are by weight unless otherwise stated.

EXAMPLE 1

Preparation of 1, 3-bis(4,4,6-trimethyl-1, 3,2-dioxaborinyl-2-oxy) tetrabutyldistannoxane (a-1)

Dibutyltin oxide (0.10 mole) and 0.10 mole of 4,4,6-trimethyl-2-hydroxy-1, 3,2-dioxaborinane were placed in a reaction vessel along with 250 ml of benzene. The mixture was heated at reflux temperature until 0.75 ml of water (83% of theory) had been removed by azeotropic distillation. After cooling to room temperature the solution was filtered and then the benzene removed by rotary evaporation at reduced pressure. The residue was a pale yellow liquid which slowly crystallized, mp 52°-54°C (sealed capillary). The infrared spectrum of the neat liquid showed a weak, broad adsorption near 3400 $cm^{-1}$, a B—O—Sn adsorption at 1190 and 1170 $cm^{-1}$ and Sn—O—Sn at 585 $cm^{-1}$. The melting point and infrared agree with published data {S. K. Mehrotra et al J. Organometallic Chem. 65, 367–376 (1974)}.

The organotin compound prepared in this example is the same organotin borate compound previously labeled herein as (a–1).

EXAMPLE 2

Preparation of 1,3-bis(4,4,6-trimethyl-1,3,2-dioxaborinyl-2-oxy) tetramethyldistannoxane (a-7)

A. In the same manner as described in Example 1, dimethyltin oxide (0.121 mole, Ventron Inc.) and 4,4,6-trimethyl-2-hydroxy-1,3,2-dioxaborinane (0.121 mole) were allowed to react in 250 ml. of benzene at reflux until no more water was removed by azeotropic distillation. The reaction formed 0.95 ml. of water (87% of theory). After cooling, the mixture was filtered and the benzene solution was evaporated at reduced pressure on a rotary evaporator. The reaction product was a white sludge which, after drying on a porous procelain plate, melted from 135°–150°C. The crude product was dissolved in hot acetonitrile and it precipitated upon cooling the solution. The white solid was isolated and a melting point of 171°–172°C was observed. Elemental analysis gave the following data (calculated values for $C_{16}H_{36}O_7B_2Sn_2$ shown in parentheses): % C=33.03(32.05),% H=6.22(6.05),% B=3.52(3.61),% Sn=37.09(39.60) The infrared spectrum in KBr disc showed the following major bands cm$^{-1}$, 2990(s) 2950(m), 1460(shoulder), 1420(s), 1400(s), 1380(s), 1352(s), 1297(s), 1275(s), 1228(s), 1211(s), 1198(s), 1177(s), 1100(w), 821(m), 795(m), 771(m), 680(m), 610(s), 596(s), 575(m), 500(w).

B. Following the procedure of S. K. Mehrotra et al cited above, 2,2'-oxybis(4,4,6-trimethyl-1,3,2-dioxaborinane) and dimethyltin oxide (Ventron) were heated without solvent at 168°–176°C for 4 hours. Cooling and crystallization from cyclohexane gave a white solid mp 169°–171°C, and having an infrared spectrum the same as the product of method A.

EXAMPLE 3

Preparation of Tris (tributyltin) borate (c–3).

Tributyltin oxide (0.06 mole) and boric acid (0.04 mole) were placed in a reaction vessel with 250 ml of benzene and heated at reflux temperature until 0.90 ml of water (83% of theory) had been removed by azeotropic distillation. The reaction time was 4 hours and further refluxing did not yield any additional water. After cooling the benzene was removed by rotary evaporation at reduced pressure and the residue was a clear pale yellow liquid. Infrared analysis of the pale yellow liquid verified the absence of Sn—O—Sn band in the product at 1280 cm$^{-1}$ {S. K. Mehrotra et al, Journal of Organometallic Chem.,65, 361–366 (1974)}. The weight of the product corresponded to a 98% yield. The organotin compound of this example is the same organotin borate previously labeled herein as (c–3).

EXAMPLE 4

Preparation of 4,4,6-trimethyl-2-hydroxy-1,3,2-dioxaborinane.

Boric acid (1 mole) and 2-methyl-2,4-pentanediol (1 mole) were placed in a reaction vessel with 1000 ml of benzene and the mixture refluxed until 2 moles of water were removed. Evaporation of the benzene at reduced pressure gave a liquid which slowly crystallized to give a white solid mp 73°–75°C {literature mp 69°–70° C, H. Steinberg and D. L. Hunter, Ind. & Eng. Chem 49, 174–181 (1957)}.

EXAMPLE 5

Preparation of 2-(tributyl stannoxy)-4,4,6-trimethyl-1,3,2-dioxaborinane (b-3).

Tributyltin oxide (0.05 mole) and 4,4,6-trimethyl-2-hydroxy-1,3,2-dioxaborinane (0.10 mole) were placed in a reaction vessel with 250 ml of benzene and the mixture refluxed until no more water was removed by azeotropic distillation. The benzene was then removed by rotary evaporation at reduced pressure to give a liquid, bp 150°–155°C at 0.6 mm Hg, $\eta^{23}$ 1.4670 { bp 152°–155°C at 1 mm Hg,$\eta_d^{30}$ 1.4612, S. K. Mehrotra et al J. Organometallic Chem., 47, 39–44 (1973)}. The yield was 87% of theory. The organotin compound of this example is the same organotin borate previously labeled herein as (b–3).

EXAMPLE 6

Preparation of 1,3-bis(4,4,6-trimethyl-1,3,2-dioxaborinyl-2-oxy)tetra-n-octyldistannoxane(a–4)

Dioctyltin oxide (Ventron Inc., 0.10 mole) was allowed to react with 0.10 mole of 4,4,6-trimethyl-2-hydroxy-1,3,2-dioxaborinane in 250 ml. of benzene at reflux until no more water was removed by azetropic distillation. The reaction formed 0.75 ml. of water (83% of theory). The reaction mixture was then filtered and the benzene solution concentrated on a rotary evaporator at reduced pressure. The reaction product was a pale yellow liquid, $\eta^{23.5}=1.4763$. The infrared showed no unreacted =B—OH groups and showed major adsorption bands at the following frequencies (cm$^{-1}$, NaCl plates): 2970(s), 2930(s), 2860(s), 1470(s), 1417(s), 1400(s), 1380(s), 1357(s), 1292(s), 1270(s), 1228(m), 1212(s), 1178(s), 680(s). The compound showed no change in infrared spectrum after 72 hours exposure to air.

EXAMPLES 7–12

The experimental heat stabilizer was added to a blend of polyvinyl chloride (Geon 103EP from B. F. Goodrich Chemical Co.) 100 parts, Titanox TiO$_2$ 1.0 part, calcium stearate 1.0 part, and Cincinnati Milacron 165 wax 0.7 part. The mixture is blended for 5 minutes at high shear in a Ronson blender. The powdered blend is placed on a 2-roll Farrell mill having the rolls at 380°F and at intervals of 2 minutes the resin color observed. Table I summarizes the results of the comparative experiments in which dimethyl tin bis-(isooctyl thioglycolate) (DMTBOT) heat stabilizer is used as a reference.

TABLE I

Comparison of Organotin Borate Compounds with DMTBOT in a Dynamic 2-Roll Mill Test at 380°F and Differential Roll Speed of 30 Front/40 Rear (RPM)*

| Example | Organotin Additive 0.5 phr** | Conc. of Octylthiol-glycolate | Color At Indicated Time(Minutes) | | | | | |
|---|---|---|---|---|---|---|---|---|
| | | | 2' | 4' | 6' | 8' | 10' | 12' |
| 7 | DMTBOT | — | White-Cream | — | Yellow | — | Grey | — |
| 8 | (a-1) | 0.33 phr | White | White | Light Cream | — | Light Grey | Dark Grey |
| 9 | (a-4) | 0.33 phr | White | White | Cream | Light Yellow | Tan | Grey |
| 10 | (a-7) | 0.33 phr | White | White | Cream | Grey | — | — |
| 11 | (c-3) | 0.33 phr | Light Cream | Cream | Brown | — | — | Grey |
| 12 | None | None | Red-Tan | — | — | — | — | — |

*Formulation:
Geon 103EP 100 parts, TiO$_2$ 1.0 phr, calcium stearate 1.0 phr, CMC 165 Wax 0.7 phr, and other additives as shown in the table.
CMC 165 Wax is Cincinnati Milacron Chemicals Inc. 165 Wax, a petroleum based hydrocarbon wax which melts at about 165°F
**phr = parts per hundred parts resin by weight

EXAMPLES 13–27

Using the blending and sampling procedures of Exampel 7, several polyvinyl chloride (PVC) blends were prepared to demonstrate the synergism of the organotin borate/organic thiol compound composition of this invention in stabilizing PVC against early color formation during processing and several organic thiol compounds usable in this invention. The formulations, processing conditions and results are presented in Tables II and III.

EXAMPLE 28

In accordance with the blending procedure, 2 roll milling conditions and sampling procedure of Example 7, the following blend was prepared and the following results obtained.

| | | |
|---|---|---|
| Polyvinyl Chloride (Geon 103EP) | 100.0 | parts |
| Titanox TiO$_2$ | 1.0 | part |
| Calcium stearate | 1.0 | part |
| Cincinnati Milacron 165 Wax | 0.7 | part |
| 2-hydroxy-4-octyloxybenzophenone | 1.0 | part |
| triphenylphosphite | 0.5 | part |

TABLE II

Comparison of Heat Stabilizing Activity of Organotin Borate Compounds in a Dynamic 2-Roll Mill Evaluation at 380°F and Differential Roll Speed of 30 Front/40 Rear (RPM)*

| EXAMPLE | Organotin Additive 0.5 phr | Conc. of Octylthio glycolate | Initial Color (2 Minutes) | Time (In Minutes) To Develop Significant Color (Tan or Grey) |
|---|---|---|---|---|
| 13 | (a-1) | 0.33 phr | White | 10 |
| 14 | (a-7) | 0.33 phr | White | 8 |
| 15 | (c-3) | 0.33 phr | Light Cream | 6 |
| 16 | None | 0.50 phr | Light Tan | 4 |
| 17 | (a-1) | None | Tan | 2 |
| 18 | (a-7) | None | Tan-Red | 2 |
| 19 | (c-3) | None | Tan | 2 |

*Formulation:
Geon 103EP 100 parts, TiO$_2$ 1.0 phr, calcium stearate 1.0 phr, Cincinnati Milacron Chemicals Inc. 165 Wax 0.7 phr, and other additives as shown in the table.

TABLE III

Evaluation of Several Thiol Compounds in Combination with 1,3-bis(4,4,6-trimethyl-1,3,2-dioxaborinyl-2-oxy) tetra-n-butyldistannoxane, designated (a-1) in a Dynamic Milling Test at 380°F and Differential Roll Speed of 30 Front/40 Rear (RPM)*

| EXAMPLE | THIOL COMPONENT (0.33 phr) | INITIAL COLOR (2 Minutes) | TIME (IN MINUTES) TO DEVELOP SIGNIFICANT COLOR (TAN OR GREY) |
|---|---|---|---|
| 20 | isooctyl thioglycolate | White | 10 |
| 21 | isooctyl β-mercaptopropionate | White | 12 |
| 22 | octadecyl thioglycolate | White | 10 |
| 23 | n-butyl thioglycolate | White | 14 |
| 24 | dodecyl mercaptan | Light Cream | 10 |
| 25 | benzyl thioglycolate | White | 12 |
| 26 | octyl mercaptan | White | 12 |
| 27 | none | Brown-Pink | 2 |

*Formulation:
100 parts Geon 103 EP, 0.5 phr 1,3-bis(4,4,6-trimethyl-1,3,2-dioxaborinyl-2-oxy) tetra-n-butyldistannoxane (a-1), 1.0 phr TiO$_2$, 1.0 phr calcium stearate, 0.7 phr Cincinnati Milacron Inc. 165 Wax, and other components as shown in table.

| | |
|---|---|
| dodecyl mercaptan | 0.33 part |
| 1,3-bis(4,4,6-trimethyl-1,3,2-dioxaborinyl-2-oxy)tetra-n-butyldistannoxane | 0.5 part |
| Initial color | Cream |
| Time to develop significant color (brown) | 12 minutes |

We claim:

1. A stabilizer composition for stabilizing vinyl halide homopolymers, vinyl halide copolymers and polymer blends containing vinyl halide homopolymers or vinyl halide copolymers against early color formation during processing comprising a synergistic combination of (1) an organotin borate which is a member selected from organotin borates having the following general formulae (a) 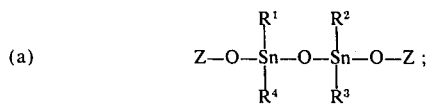

(b) 

and (c) 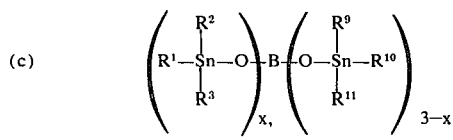

where $R^1$, $R^2$, $R^3$, $R^4$, $R^9$, $R^{10}$ and $R^{11}$ are the same or different and are an aryl group, aralkyl group, alkaryl group or $C_1$ to $C_8$ alkyl group, $x$ is 0, 1 or 2 and Z is

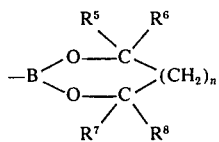

where $R^5$ and $R^7$ are hydrogen or $C_1$ to $C_4$ alkyl group, $R^6$ and $R^8$ are $C_1$ to $C_4$ alkyl group and $n$ is 0, 1 or 2 and (2) an organic thiol compound having a molecular weight of from 40 to 400 per thiol group and a boiling point of at least 180° C at one atmosphere pressure.

2. The stabilizer composition of claim 1 wherein the organic thiol compound is a member selected from organic thiol compounds having the following general formulae (d) $\left( HS-R^{12}-\overset{O}{\underset{\|}{C}}-O \right)_y M$ ;

(e) $R^{13}-(SH)_r$;

(e) $\left( HS-R^{12}-\overset{O}{\underset{\|}{C}}-O \right)_w Q(OH)_u$ ;

and (f) 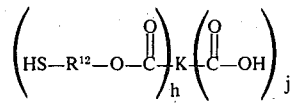

where $R^{12}$ is a $C_1$ to $C_{20}$ linear or branched alkylene radical, $R^{13}$ is an aromatic group or $C_3$ to $C_{36}$ aliphatic group having a free valence equal to $v$, M is hydrogen, calcium, barium, tin, cadmium or lead, Q is a saturated or unsaturated aliphatic group, cycloaliphatic group or aromatic group and having a free valence equal to $(w + u)$, K is a saturated or unsaturated aliphatic group, cycloaliphatic group or aromatic group and having a free valence equal to $(h + j)$, $y$ is 1 to 4, $v$ is 1 to 6, $w$ is 1 to 8, $u$ is 0 to 7, $h$ is 1 to 4 and $j$ is 0 to 3 wherein $w + u$ is from 1 to 8 and $h + j$ is from 1 to 4.

3. The stabilizer composition of claim 2 wherein the organotin borate has the following general formula

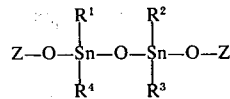

wherein $R^1$, $R^2$, $R^3$ and $R^4$ are the same or different and are aryl group, aralkyl group, alkaryl group or $C_1$ to $C_8$ alkyl group and Z is

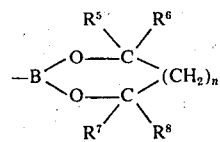

where $R^5$ and $R^7$ are hydrogen or $C_1$ to $C_4$ alkyl group, $R^6$ and $R^8$ are $C_1$ to $C_4$ alkyl group and $n$ is 0, 1 or 2.

4. The stabilizer composition of claim 2 wherein the organotin borate has the following general formula

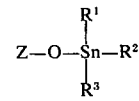

wherein $R^1$, $R^2$ and $R^3$ are the same or different and are an aryl group, aralkyl group, alkaryl group or $C_1$ to $C_8$ alkyl group and Z is

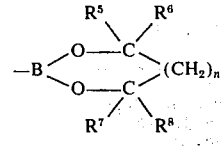

where $R^5$ and $R^7$ are hydrogen or $C_1$ to $C_4$ alkyl group, $R^6$ and $R^8$ are $C_1$ to $C_4$ alkyl group and $n$ is 0, 1 or 2.

5. The stabilizer composition of claim 2 wherein the organotin borate has the following general formula

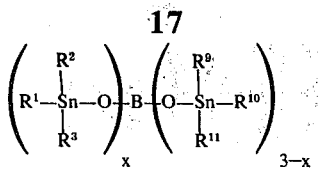

where $R^1$, $R^2$, $R^3$, $R^9$, $R^{10}$ and $R^{11}$ are the same or different and are an aryl group, aralkyl group, alkaryl group or $C_1$ to $C_8$ alkyl group and $x$ is 0, 1 or 2.

6. The stabilizer composition of claim 2 wherein the weight ratio of organotin borate to organic thiol compound is from 1:4 to 4:1.

7. The stabilizer composition of claim 6 wherein the weight ratio of organotin borate to organic thiol compound is from 1:1 to 7:3.

8. The stabilizer composition of claim 6 wherein the organotin borate is 1,3-bis(4,4,6-trimethyl-1,3,2-dioxaborinyl-2-oxy) tetramethyldistannoxane.

9. The stabilizer composition of claim 6 wherein the organotin borate is 1,3-bis(4,4,6-trimethyl-1,3,2-dioxaborinyl-2-oxy) tetrabutyldistannoxane.

10. A plastic composition having improved resistance to early color formation during processing comprising (1) a vinyl halide homopolymer, vinyl halide copolymer or polymer blend containing a vinyl halide homopolymer or vinyl halide copolymer, (2) an organic thiol compound having a molecular weight per thiol group of from 40 to 400 and a boiling point of at least 180° C at one atmosphere pressure, and (3) an organotin borate which is a member selected from organotin borates having the following general formulae (a) 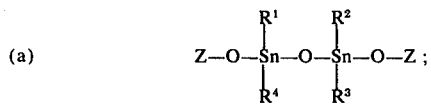

(b) 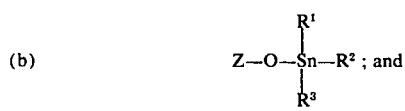

(c) 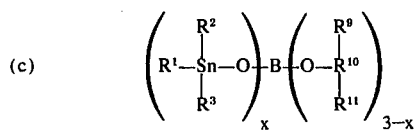

where $R^1$, $R^2$, $R^3$, $R^4$, $R^9$, $R^{10}$ and $R^{11}$ are the same or different and are an aryl group, aralkyl group, alkaryl group or $C_1$ to $C_8$ alkyl group, $x$ is 0, 1 or 2 and Z is

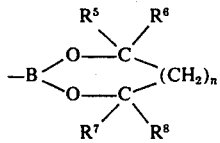

where $R^5$ and $R^7$ are hydrogen or $C_1$ to $C_4$ alkyl group, $R^6$ and $R^8$ are $C_1$ to $C_4$ alkyl group and $n$ is 0, 1 or 2, said organotin borate and said organic thiol compound being present in a stabilizing effective amount.

11. The plastic composition of claim 10 wherein the organic thiol compound is selected from organic thiol compounds having the following general formulae (d) 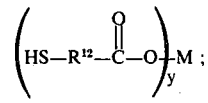

(e) $R^{13}{+}SH)_v$ ;

(f) 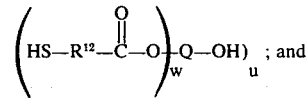 ; and (g) 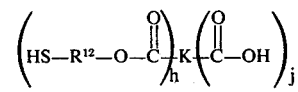

where $R^{12}$ is a $C_1$ to $C_{20}$ linear or branched alkylene radical, $R^{13}$ is an aromatic or $C_3$ to $C_{36}$ aliphatic group having a free valence equal to $v$, M is hydrogen, calcium, barium, tin, cadmium or lead, Q is a saturated or unsaturated aliphatic group, cycloaliphatic group or aromatic group and having a free valence equal to ($w + u$), K is a saturated or unsaturated aliphatic group, cycloaliphatic group, or aromatic group and having a free valence equal to ($h + j$), $y$ is 1 to 4, $v$ is 1 to 6, $w$ is 1 to 8, $u$ is 0 to 7, $h$ is 1 to 4 and $j$ is 0 to 3 wherein $w + u$ is from 1 to 8 and $h + j$ is from 1 to 4.

12. The plastic compositions of claim 11 wherein the weight ratio of the organotin borate to the organic thiol compound is from 1:4 to 4:1.

13. The plastic compositions of claim 11 wherein the combined weight concentration of the organotin borate plus the organic thiol compound is from 0.01 to 5 weight percent based on the weight of the vinyl halide homopolymer, vinyl halide copolymer or polymer blend containing a vinyl halide homopolymer or vinyl halide copolymer.

14. The plastic compositions of claim 11 wherein the organotin borate has the following general formula

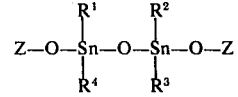

where $R^1$, $R^2$, $R^3$ and $R^4$ are the same or different and are an aryl group, aralkyl group, alkaryl group or $C_1$ to $C_8$ alkyl group, and Z is

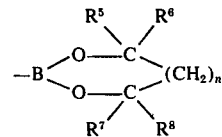

where $R^5$ and $R^7$ are hydrogen or $C_1$ to $C_4$ alkyl group, $R^6$ and $R^8$ are $C_1$ to $C_4$ alkyl group and $n$ is 0, 1 or 2.

15. The plastic composition of claim 11 wherein the organotin borate has the following general formula

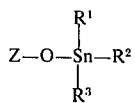

where $R^1$, $R^2$ and $R^3$ are the same or different and are an aryl group, aralkyl group, alkaryl group or $C_1$ to $C_8$ alkyl group and Z is

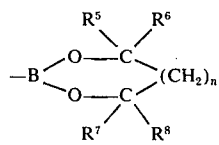

where $R^5$ and $R^7$ are hydrogen or $C_1$ to $C_4$ alkyl group, $R^6$ and $R^8$ are $C_1$ to $C_4$ alkyl group and $n$ is 0, 1 or 2.

16. The plastic compositions of claim 11 wherein the organotin borate has the following general formula

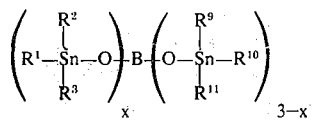

where $R^1$, $R^2$, $R^3$, $R^9$, $R^{10}$ and $R^{11}$ are the same or different and are an aryl group, aralkyl group, alkaryl group or $C_1$ to $C_8$ alkyl group and $x$ is 0, 1 or 2.

17. The plastic compositions of claim 11 wherein the organotin borate is 1,3-bis(4,4,6-trimethyl-1,3,2-dioxaborinyl-2-oxy) tetramethyldistannoxane.

18. The plastic compositions of claim 11 wherein the organotin borate is 1,3-bis(4,4,6-trimethyl-1,3,2-dioxaborinyl-2-oxy) tetrabutyldistannoxane.

19. The plastic compositions of claim 11 wherein the vinyl halide homopolymer, vinyl halide copolymer or polymer blend containing a vinyl halide homopolymer or vinyl halide copolymer is polyvinyl chloride, a vinyl chloride copolymer or a polymer blend containing polyvinyl chloride or a vinyl chloride copolymer.

20. The plastic compositions of claim 12 wherein the weight ratio is from 1:1 to 7:3.

21. The plastic compositions of claim 13 wherein the weight concentration is from 0.5 to 1.0 weight percent.

* * * * *

UNITED STATES PATENT OFFICE
CERTIFICATE OF CORRECTION

PATENT NO. : 3,928,285
DATED : December 23 1975
INVENTOR(S) : Robert George Gough; Francis Joseph Buescher It is certified that error appears in the above-identified patent and that said Letters Patent are hereby corrected as shown below:

In Column 5, formula (g) "$- \overset{\overset{O}{\|}}{C} - OH)j$" should read $-- (\overset{\overset{O}{\|}}{C} - OH)j --$.

In Column 6, formula (a) the "$Ch_3$" should read $--CH_3--$.

In Column 10, line 65, "$cm^{116\ 1}$" should read $--cm^{-1}--$.

In Column 17, claim 10, formula (c) "$\left( O - \underset{R^{11}}{\overset{R^9}{R^{10}}} \right)_{3-X}$"

should read $-- \left( O - \underset{R^{11}}{\overset{R^9}{Sn}} - R^{10} \right)_{3-X} --$.

In Column 18, claim 11, formula (f) "$- OH)\mu$" should read $-- (OH)\mu --$.

Signed and Sealed this

Tenth Day of August 1976

[SEAL]

Attest:

RUTH C. MASON
*Attesting Officer*

C. MARSHALL DANN
*Commissioner of Patents and Trademarks*